US011899402B2

(12) United States Patent
Zaugg et al.

(10) Patent No.: US 11,899,402 B2
(45) Date of Patent: Feb. 13, 2024

(54) SYSTEM FOR ADJUSTING THE POSITION OF A FIRST TOOTHED WHEEL SET RELATIVE TO A SUPPORT ON WHICH THE FIRST TOOTHED WHEEL SET IS PIVOTABLY MOUNTED AND TIMEPIECE COMPRISING SUCH A SYSTEM

(71) Applicant: Montres Breguet S.A., L'Abbaye (CH)

(72) Inventors: Alain Zaugg, Le Sentier (CH); Daniel Matteazzi, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 0 days.

(21) Appl. No.: 18/059,663

(22) Filed: Nov. 29, 2022

(65) Prior Publication Data

US 2023/0091990 A1 Mar. 23, 2023

Related U.S. Application Data

(63) Continuation of application No. 16/687,831, filed on Nov. 19, 2019, now Pat. No. 11,550,264.

(30) Foreign Application Priority Data

Dec. 10, 2018 (EP) .................................... 18211344

(51) Int. Cl.
*G04B 19/25* (2006.01)
*G04B 13/02* (2006.01)
*G04B 19/253* (2006.01)

(52) U.S. Cl.
CPC ....... *G04B 19/25366* (2013.01); *G04B 13/02* (2013.01)

(58) Field of Classification Search
CPC .. G04B 13/02; G04B 19/25366; G04B 13/00; G04B 19/253; G04B 19/25
See application file for complete search history.

(56) References Cited

U.S. PATENT DOCUMENTS 674,712 A 5/1901 Sandoz
3,438,196 A 4/1969 Teramoto et al.
(Continued)

FOREIGN PATENT DOCUMENTS

CH 707 959 A1 10/2014
CN 85103634 A 6/1986
(Continued)

OTHER PUBLICATIONS

Notice of the Reason for Refusal dated Oct. 13, 2020 in Japanese Patent Application No. 2019-215210 (with English language translation), 5 pages.

(Continued)

*Primary Examiner* — Sean Kayes
(74) *Attorney, Agent, or Firm* — Oblon, McClelland, Maier & Neustadt, L.L.P.

(57) ABSTRACT

A system adjusts the angular position of a first toothed wheel set relative to a support on which the first toothed wheel set is mounted such that it can pivot. The adjusting system includes an adjusting member allowing an action to be applied to an angular position of the first toothed wheel set to adjust the angular position of the first toothed wheel set relative to the support. The invention adjusting system can be incorporated into a timepiece.

8 Claims, 7 Drawing Sheets

(56) References Cited

U.S. PATENT DOCUMENTS

| | | | | |
|---|---|---|---|---|
| 3,659,165 | A * | 4/1972 | Dome | G04F 5/066 331/116 R |
| 9,778,621 | B2 | 10/2017 | Mahler | |
| 10,048,650 | B2 | 8/2018 | Balmer | |
| 10,222,751 | B2 | 3/2019 | Robin | |
| 10,365,608 | B2 | 7/2019 | Mertenat | |
| 2012/0213037 | A1 | 8/2012 | Schmidt | |
| 2012/0269044 | A1* | 10/2012 | Bas | G04B 13/007 368/127 |
| 2014/0301171 | A1 | 10/2014 | Forsey et al. | |
| 2015/0063083 | A1* | 3/2015 | Kawauchiya | G04B 17/285 368/127 |
| 2015/0346689 | A1* | 12/2015 | Rebetez | G04B 13/021 368/35 |
| 2016/0139567 | A1* | 5/2016 | Philippine | G04F 7/0842 368/101 |
| 2016/0202664 | A1 | 7/2016 | Carreno | |
| 2018/0173164 | A1 | 6/2018 | Robin | |
| 2018/0246470 | A1 | 8/2018 | Orny et al. | |

FOREIGN PATENT DOCUMENTS

| | | | |
|---|---|---|---|
| CN | 1074295 | A | 7/1993 |
| CN | 1366217 | A | 8/2002 |
| CN | 2524261 | Y | 12/2002 |
| CN | 1685292 | A | 10/2005 |
| CN | 1716134 | A | 1/2006 |
| CN | 1892515 | A | 1/2007 |
| CN | 1950250 | A | 4/2007 |
| CN | 102109807 | A | 6/2011 |
| CN | 202177785 | U | 3/2012 |
| CN | 102645884 | A | 8/2012 |
| CN | 102645886 | A | 8/2012 |
| CN | 102968042 | A | 3/2013 |
| CN | 107580689 | A | 1/2018 |
| CN | 108593288 | A | 9/2018 |
| EP | 1953612 | A2 | 8/2008 |
| EP | 3147 728 | A1 | 3/2017 |
| GB | 1306432 | | 2/1973 |
| GB | 1319315 | A | 6/1973 |
| JP | 49-6116 | | 2/1974 |

OTHER PUBLICATIONS

Combined Chinese Office Action and Search Report dated Dec. 23, 2020 in Patent Application No. 201911260246.1 (with English translation of Category of Cited Documents), 8 pages.

European Search Report dated Jun. 21, 2019 in European Application 18211344.9 filed on Dec. 10, 2018 (with English Translation of Categories of Cited Documents).

Combined Chinese Office Action and Search Report dated Dec. 7. 2021 in Chinese Patent Application No. 201911260246.1 (with English translation), 10 pages.

* cited by examiner

SYSTEM FOR ADJUSTING THE POSITION OF A FIRST TOOTHED WHEEL SET RELATIVE TO A SUPPORT ON WHICH THE FIRST TOOTHED WHEEL SET IS PIVOTABLY MOUNTED AND TIMEPIECE COMPRISING SUCH A SYSTEM

CROSS REFERENCE TO RELATED APPLICATIONS

This is a continuation of U.S. application Ser. No. 16/687,831, filed on Nov. 19, 2019, which is based on and claims priority to European Application No. 18211344.9, filed on Dec. 10, 2018. The entire contents of each of the above-identified documents are incorporated herein by reference.

TECHNICAL FIELD OF THE INVENTION

The present invention relates to a system for adjusting the position of a first toothed wheel set relative to a support on which the first toothed wheel set is mounted such that it can pivot. In particular, the present invention relates to a system for adjusting the angular position of a pinion borne by a wheel with which it forms a wheel set. The present invention further relates to a timepiece comprising such an adjusting system.

BACKGROUND ART

A conventional date display mechanism for a timepiece such as a wristwatch essentially comprises a date ring on the circumference whereof the date indications from “1” to “31” are placed. This date ring advances by one step per day. At the end of the months having less than 31 days, the owner of the watch must advance the date ring from the date indication “28” or from the date indication “29” in the event of a leap year, to the date indication “1” when in February, and from the date indication “30” to the date indication “1” for the other months of the year having less than 31 days.

Date display mechanisms requiring intervention by the owner at the end of each month having less than 31 days are referred to as simple date display mechanisms. Date display mechanisms that only require one intervention by the owner per year, when passing from the month of February to the month of March, are referred to as semi-perpetual date display mechanisms. Finally, date display mechanisms that spontaneously pass from the date indication of the last day of a month having less than 31 days to the date indication of the first day of the following month, including on leap years, are referred to as perpetual date display mechanisms.

Date display mechanisms comprising a single ring around the circumference whereof the date indications from “1” to “31” are distributed have the advantage of comprising a limited number of parts. They are therefore more cost-effective and easier to incorporate into a horological movement of a mechanical or electromechanical watch. However, only an angular sector of a little less than 12° is available for reproducing each of the 31 date indications on the date ring. The size of the date indications is thus inevitably limited by the dimensions of the date ring, which can make these date indications hard to read.

Alongside date display mechanisms wherein the display member is a ring on which the thirty-one date indications are placed, so-called “large date” calendar display mechanisms are also known, which are also intended to equip mechanical or electromechanical timepieces. These large date calendar display mechanisms are thus named because they allow the date indication to be displayed on a larger scale, which eases reading of the date and constitutes an undeniable advantage in terms of the aesthetics of the timepiece equipped with such a mechanism.

Large date calendar display mechanisms conventionally comprise a first date indicator on which the indications of the units component of the date from “0” to “9” are placed. These 10 digits are reproduced on the first date indicator according to sequences which depend on the operating mode of the large date display mechanism considered. These date display mechanisms are complemented by a second date indicator on which the indications of the tens component of the date from “0” to “3” are reproduced. Thus, by suitably adjusting the position of the first date indicator relative to the second date indicator, all of the date indications from “01” to “31” can be constituted by combining the indications of the units component of the date borne by the first date indicator with the indications of the tens component of the date borne by the second date indicator. Since the first date indicator only bears the indications of the units component of the date and since the second date indicator only bears the indications of the tens component of the date, additional space is available for reproducing these indications which can thus be larger in size. The reading of a large date calendar indicator device is thus made easier and the aesthetics of a timepiece equipped with such a date indicator device are significantly improved.

Date display mechanisms of the “large date” type nonetheless pose problems when passing from “31” of a given month to “01” of the following month. More specifically, the indication of the units component “1” of the date which is used to form the date indication “31” is the same as the indication of the units component “1” of the date with which the date indication “01” is formed. As a result, during the passage from the date indication “31” to the date indication “01”, the indication of the units component “1” of the date must remain unchanged, whereas the indication of the tens component of the date passes from the value “3” to the value “0”. In other words, when passing from the end of a month having 31 days to the first day of the following month, the first date indicator on which the indications of the units component of the date are placed, must remain still. In order to reach this objective, the horological movement which, under normal circumstances, allows the large date display mechanism to advance daily, must be prevented from driving the first date indicator when passing from the last day of a month having 31 days to the first day of the following month.

The solution often proposed to overcome this problem consists of depriving one of the wheels located in the kinematic chain between the output of the horological movement and the date indicator bearing the indications of the units component of the date of at least one tooth such that, when passing from “31” to the “01”, this wheel, although driven by the horological movement, does not, in turn, drive the pinion with which it is engaged and which also contributes to driving the indicator of the units component of the date. Given that the pinion remains still during this period, the kinematic linkage between the horological movement and the first date indicator bearing the indications of the units component of the date is interrupted, and the indication of the units component “1” of the date remains unchanged.

However, this solution is not perfect since, during the 24 hours that separate the passage from the last day of a month having 31 days to the end of the first day of the following month and during which the pinion is no longer engaged with the wheel which the rest of the time ensures the driving thereof, the maintenance of the position of the pinion, and thus of the first date indicator bearing the indications of the units component of the date, is no longer ensured, which is not acceptable since no guarantee can be given regarding the suitable positioning of the indication of the units component of the date in an aperture made in a dial of the timepiece and through which the date indication can be seen. Moreover, when the wheel revolves and is found in a position wherein it is capable of meshing again with the pinion, the pinion may not be appropriately positioned and the wheel may not be able to re-engage with this pinion, which results in the mechanism becoming obstructed. It is therefore essential that the correct indexing of the pinion is constantly guaranteed, in particular during the period wherein this pinion is not engaged with the wheel that usually drives it.

For the aforementioned reasons, all necessary provisions must be taken to ensure the precise angular positioning between the wheel and the pinion.

SUMMARY OF THE INVENTION

The purpose of the present invention is to overcome the aforementioned problem by providing a mechanism allowing the angular position of a first toothed wheel set to be adjusted relative to a support on which the first toothed wheel set is mounted such that it can pivot. In particular, the present invention relates to a mechanism for adjusting the angular position of a pinion relative to a wheel with which the pinion forms a wheel set.

In order to fulfil this purpose, the present invention discloses a system for adjusting the angular position of a first toothed wheel set relative to a support on which the first toothed wheel set is mounted such that it can pivot, the adjusting system comprising an adjusting member allowing an action to be applied to an angular position of the first toothed wheel set relative to the support.

According to one particular embodiment of the invention, the first toothed wheel set is a pinion, and the support is a wheel on which the pinion is frictionally mounted so as to form a wheel set.

According to another embodiment of the invention, the adjusting member is a toothed wheel set, the angular position whereof is adjustable and which is engaged with the first toothed wheel set, the angular position whereof is to be adjusted.

The present invention further relates to a timepiece comprising an adjusting system according to the invention.

Thanks to these features, the present invention provides a system that allows the angular position of a first toothed wheel set to be precisely adjusted relative to a support on which the first toothed wheel set is mounted such that it can pivot. Optimum meshing can thus be guaranteed between the first toothed wheel set and a second toothed wheel set with which the first toothed wheel set meshes and, subsequently, the correct positioning can be guaranteed of all of the wheel sets which, in a kinematic chain in which the first and second wheel sets are included, are disposed upstream and downstream of the first, and respectively of the second wheel set. In order to fulfil this purpose, the present invention discloses using an adjusting member of the key type, the angular position whereof is adjustable, for example by means of a screwdriver. This adjusting member, mounted such that it can pivot on the support that bears the first wheel set or on a separate support, is engaged with the first wheel set such that, by causing the adjusting member to pivot, the angular position of this first wheel set can be adjusted.

The present invention further relates to a large date calendar display mechanism driven via a kinematic chain by a horological movement of a timepiece equipped with this large date calendar display mechanism, this large date calendar display mechanism comprising a first date indicator on which the indications of the units component of the date from “0” to “9” are placed, and a second date indicator on which the indications of the tens component of the date from “0” to “3” are placed, whereby all of the date indications from “01” to “31” can be obtained by combining the indications of the units component “0” to “9” of the date, borne by the first date indicator, with the indications of the tens component “0” to “3” of the date, borne by the second date indicator, the first date indicator remaining still during a 24-hour period separating the passage from the last day of a month having 31 days to the end of the first day of the following month, the kinematic chain comprising a wheel that is continuously engaged with the horological movement and which has a perimeter provided with teeth via which the wheel meshes with a pinion which itself contributes to driving the first indicator of the units component of the date, the wheel being, at one point along the perimeter thereof, devoid of teeth such that, during the 24-hour period separating the passage from the last day of a month having 31 days to the end of the first day of the following month, the wheel does not mesh with the pinion which, similarly to the first date indicator, thus remains still, the large date calendar display mechanism further comprising a units drive pinion engaged with an intermediate wheel, the units drive pinion being frictionally mounted on a units drive wheel with which it forms a units drive wheel set, a toothed adjusting member, the angular position whereof is adjustable and which is engaged with the units drive pinion, being borne by the units drive wheel.

According to another embodiment of the invention, a dual jumper is mounted such that it can pivot about an axis and comprises, at a first end, a first beak via which it is engaged with a toothing of the first date indicator and, at a second end, a second beak via which it is engaged with a toothing of an intermediate pinion, the dual jumper being elastically held such that it is engaged with the first date indicator and with the pinion.

Thanks to these features, the present invention provides a large date calendar display mechanism wherein the position of a pinion that contributes to driving the indicator of the units component of the date is precisely adjusted, so as to guarantee optimum meshing between this units drive pinion and the intermediate wheel with which this pinion is engaged.

On the other hand, during the passage from a month having 31 days to the end of the first day of the following month, the units drive pinion must be uncoupled from the horological movement so that the indicator of the units component of the date remains still during this period. Effectively, the marking “1” borne by the indicator of the units component of the date is used both to compose the date indication “31” at the end of a month having 31 days, and to compose the date indication “01” at the start of the following month. It is therefore key that the indicator of the units component of the date remains still during this lapse of time so that the date indication that appears through an aperture made in a dial of the timepiece is accurate. As a result, the units drive pinion must be uncoupled so that the horological movement, which operates in a continuous fashion, cannot drive the indicator of the units component of the date.

However, it is easily understood that the fact that the units drive pinion is momentarily uncoupled from the wheel that drives it under normal circumstances creates a problem insofar as the positioning of this units drive pinion cannot be ensured during this period. As a result, when the wheel revolves and is found in a position wherein it is capable of meshing again with the units drive pinion, this units drive pinion may not be appropriately positioned and the wheel may not be able to re-engage with this pinion, which results in the mechanism becoming obstructed. It is therefore essential that the correct indexing of the units drive pinion is constantly guaranteed, in particular during the period wherein this pinion is not engaged with the wheel that usually drives it.

This is why, according to a particular embodiment of the invention, a dual jumper is provided, which dual jumper is engaged, at one of the ends thereof, with a toothing of the units drive pinion. Similarly, the dual jumper is engaged with a toothing of the indicator of the units component of the date so as to continuously guarantee the correct positioning of the indication of the units component of the date in the aperture made in the dial of the timepiece.

It should be noted that, since the dual jumper is hinged such that it pivots, it is released from the engagement thereof with the units drive pinion when pushed back by the toothing of the first date indicator, and vice-versa.

BRIEF DESCRIPTION OF THE FIGURES

Other features and advantages of the present invention will be better understood upon reading the following detailed description of one example embodiment of the system for adjusting the angular position of a toothed wheel set according to the invention, said example being provided for the purposes of illustration only and not intended to limit the scope of the invention, given with reference to the accompanying drawing, wherein.

DETAILED DESCRIPTION OF ONE EMBODIMENT OF THE INVENTION

The present invention was drawn from the general inventive idea consisting of ensuring a precise angular positioning between a first toothed wheel set and a support on which the first toothed wheel set is mounted such that it can rotate in order to guarantee optimum meshing between this first toothed wheel set and a second toothed wheel set with which the first toothed wheel set is engaged. To achieve this outcome, the present invention proposes precisely adjusting the angular position of the first toothed wheel set relative to the support on which the first toothed wheel set is mounted. For this purpose, an adjusting member is provided, the position whereof can be adjusted by means of a tool such as a screwdriver and which meshes with the first toothed wheel set. Thus, by actuating the adjusting member, the angular position of the first toothed wheel set can be very precisely adjusted.

The present invention is of interest in particular, but not limited thereto, in a large date calendar display mechanism wherein, in order to guarantee the correct operation of this date display mechanism, when passing from the last day of a month having 31 days to the first day of the following month, the mechanical link between the horological movement and the indicator of the units component of the date must be interrupted. However, during this lapse of time, an intermediate pinion is no longer engaged with the drive wheel which usually drives it. The indexing of the angular position of this intermediate pinion is thus no longer ensured. In order to nonetheless guarantee impeccable operation of the large date calendar display mechanism, the present invention provides for precisely adjusting the angular position of a wheel set included in the kinematic chain to which the intermediate pinion belongs, in order to guarantee optimum meshing between the different wheel sets of this kinematic chain.

The present invention will be described with reference to a date display mechanism of the "large date" type, wherein the problem of adjusting the angular position of a pinion relative to a wheel with which the pinion meshes applies. It is, however, key to understand that the example of such a large date calendar display mechanism is given for illustrative purposes only and is not intended to limit the scope of the invention, and that the adjusting system according to the invention for adjusting the angular position of a first wheel set relative to another wheel set with which the first wheel set meshes can be used in any type of horological mechanism which is subject to the problem of ensuring the correct angular positioning of one wheel set relative to another.

Figure 1A:
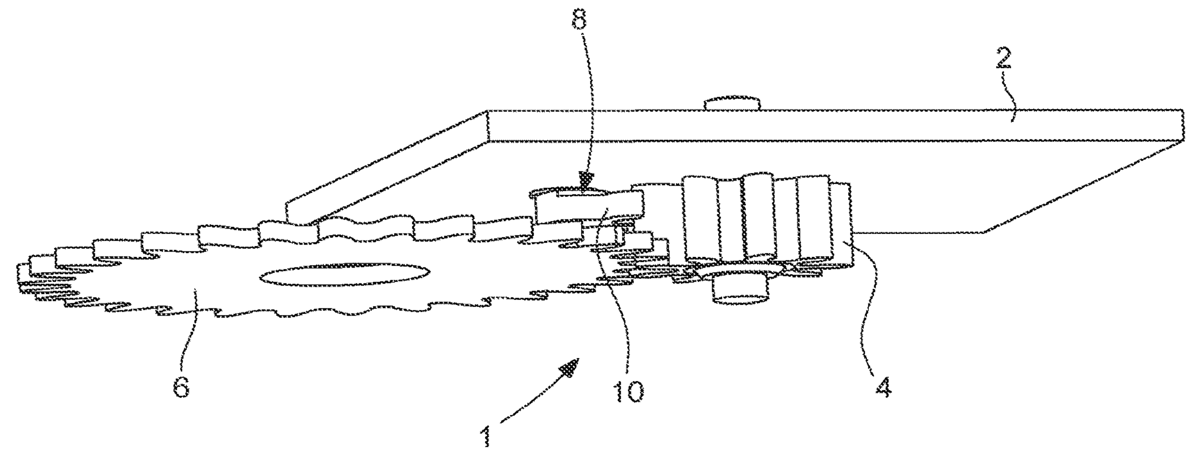
FIGS. 1A and 1B are diagrammatic views showing the principle of the system for adjusting the angular position of a wheel set according to the invention.
Figure 1B:
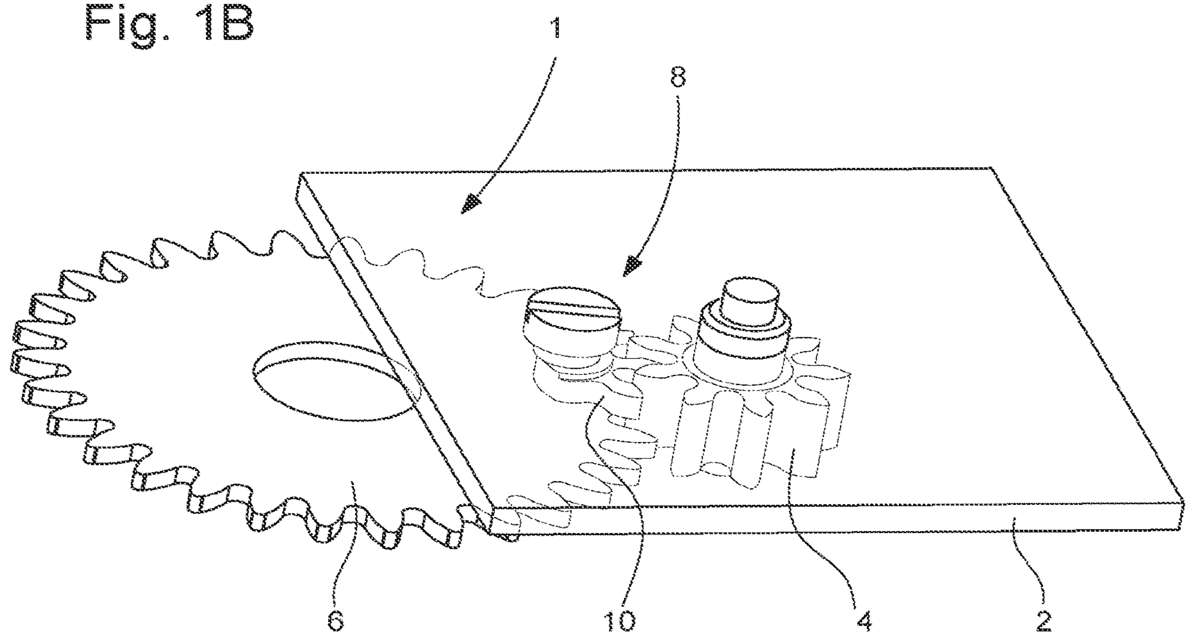

As diagrammatically shown in FIGS. 1A and 1B accompanying the present patent application, the adjusting system 1 according to the invention comprises a support 2 on which a first toothed wheel set 4 is mounted such that it can rotate. This first toothed wheel set 4 meshes with a second toothed wheel set 6. One of the purposes of the invention is to allow the angular position of the first toothed wheel set 4 relative to the second toothed wheel set 6 to be precisely adjusted in order to guarantee optimum meshing between the two toothed wheel sets 4 and 6. For this purpose, the adjusting system 1 according to the invention comprises an adjusting member 8 that is mounted such that it can pivot on the support 2. According to a particular embodiment of the invention, the adjusting member 8 can be mounted on a support that is different to that on which the first toothed wheel set 4 is mounted. This adjusting member 8 comprises a toothed sector 10 via which it meshes with the first toothed wheel set 4. By causing this adjusting member 8 to pivot in one direction or in the other, for example by means of a screwdriver, the position of the first toothed wheel set 4 can be precisely adjusted relative to the second toothed wheel set 6.

Figure 2:
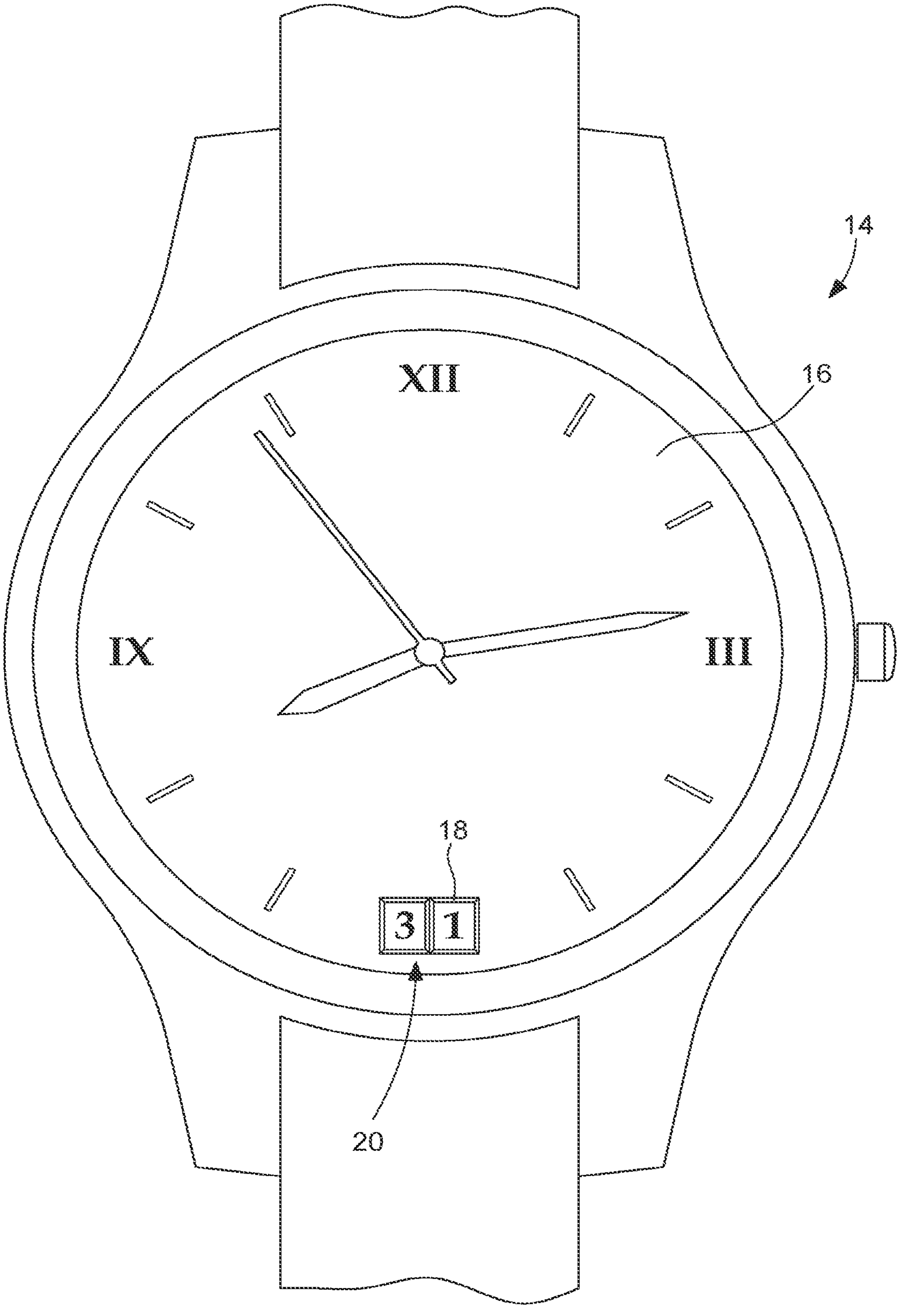
FIG. 2 is a top view of a timepiece of the wristwatch type equipped with a large date calendar display mechanism comprising an adjusting system according to the invention.

Solely by way of example, the adjusting system 1 according to the invention can be integrated into a large date display mechanism 12 fitting (see FIG. 2) a timepiece 14 such as a wristwatch. This timepiece 14 comprises a dial 16 wherein an aperture 18 is made, through which a large date indication 20 is visible.

Figure 3:
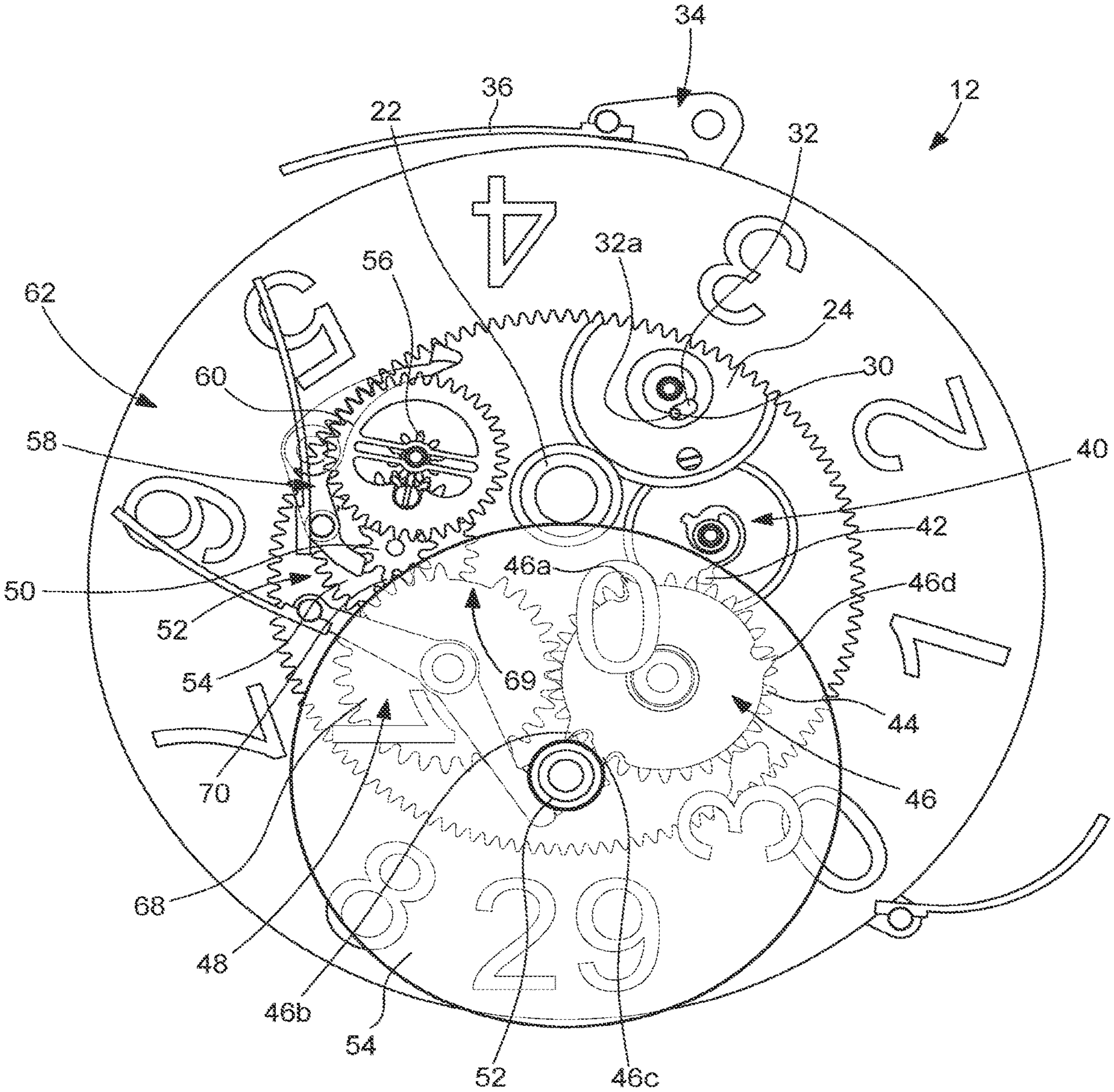
FIG. 3 is a plan view of the large date calendar display mechanism equipped with the adjusting system according to the invention, wherein the indicator of the tens component of the date is shown transparently.

With reference to FIG. 3, the large date display mechanism 12 is shown to comprise an intermediate centre wheel 22 which is conventionally rigidly connected to an hour wheel driven by a motion-work of a horological movement (not shown). This intermediate centre wheel 22 meshes with a cam drive wheel 24 which is driven one revolution per day. This cam drive wheel 24 drives, in turn, a cam wheel 26 on which a cam 28 is fixed.

Figure 6:
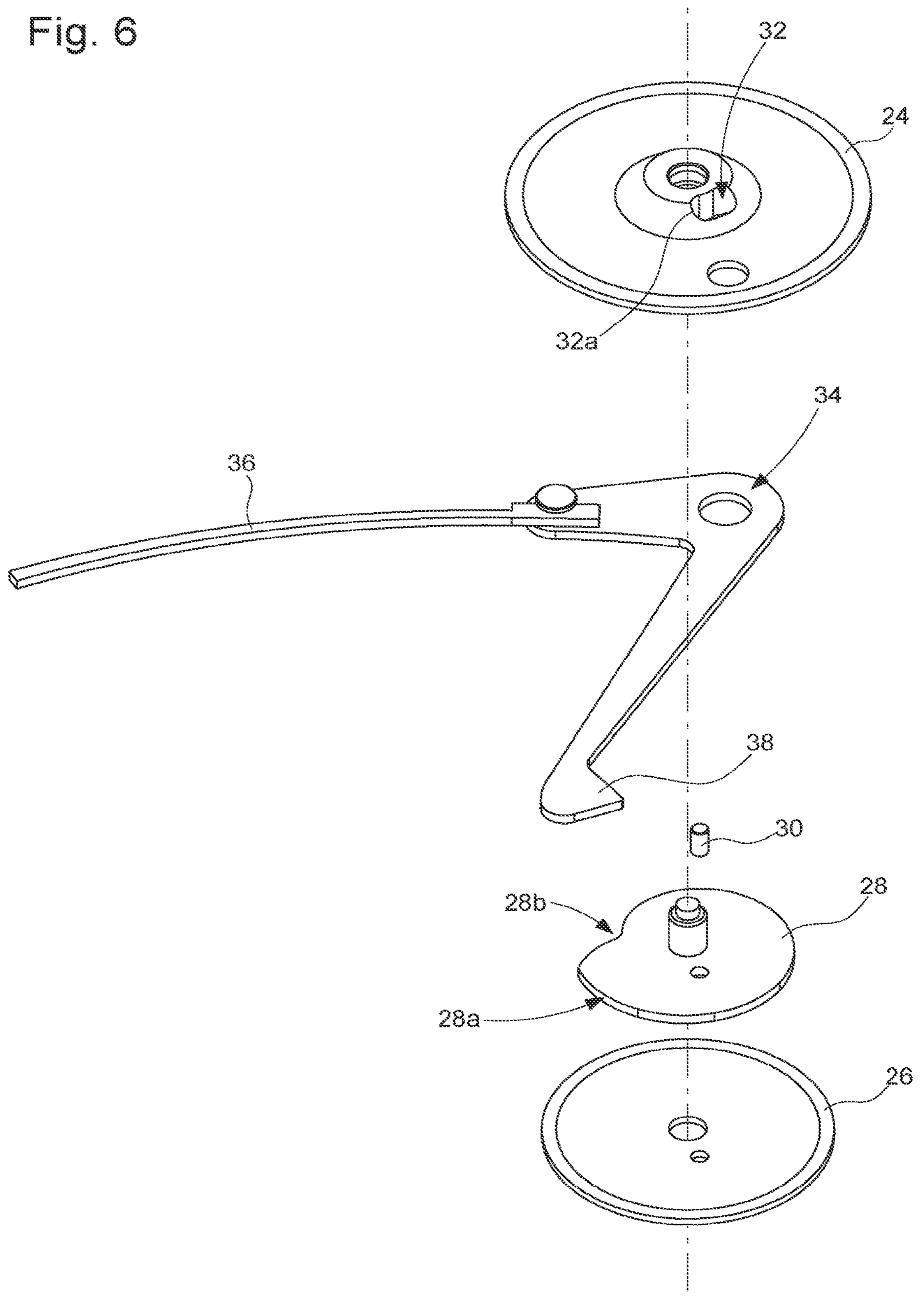
FIG. 6 is a perspective view from below of the large date calendar display mechanism revealing the cam drive mechanism which controls the release of the date display mechanism once per day.

The cam drive wheel 24 and the cam wheel 26 are kinematically connected to one another by means of a pin 30 driven into the cam wheel 26 and which freely passes through an oblong hole 32 made in the cam drive wheel 24 (see FIG. 6.) When the cam drive wheel 24 revolves, it drives the cam wheel 26 thanks to the pin 30 which abuts against an inner edge 32*a* of the oblong hole 32. The cam 28 has a profile 28*a* at one point whereof a discontinuity 28*b* is provided. A release lever 34, elastically stressed by a spring 36, comprises a beak 38 via which it follows the profile 28*a* of the cam 28.

Once a day, at around midnight, the release lever 34 falls along the discontinuity 28*b* of the profile 28*a* of the cam 28 and causes the cam wheel 26 to instantly pivot by an angle that is defined by the discontinuity 28*b* of the profile 28*a* of the cam 28. It should be noted that the dimensions of the oblong hole 32 are sufficient to allow the cam wheel 26 to perform the instant pivoting movement thereof without being hindered by the pin 30.

Figure 4:
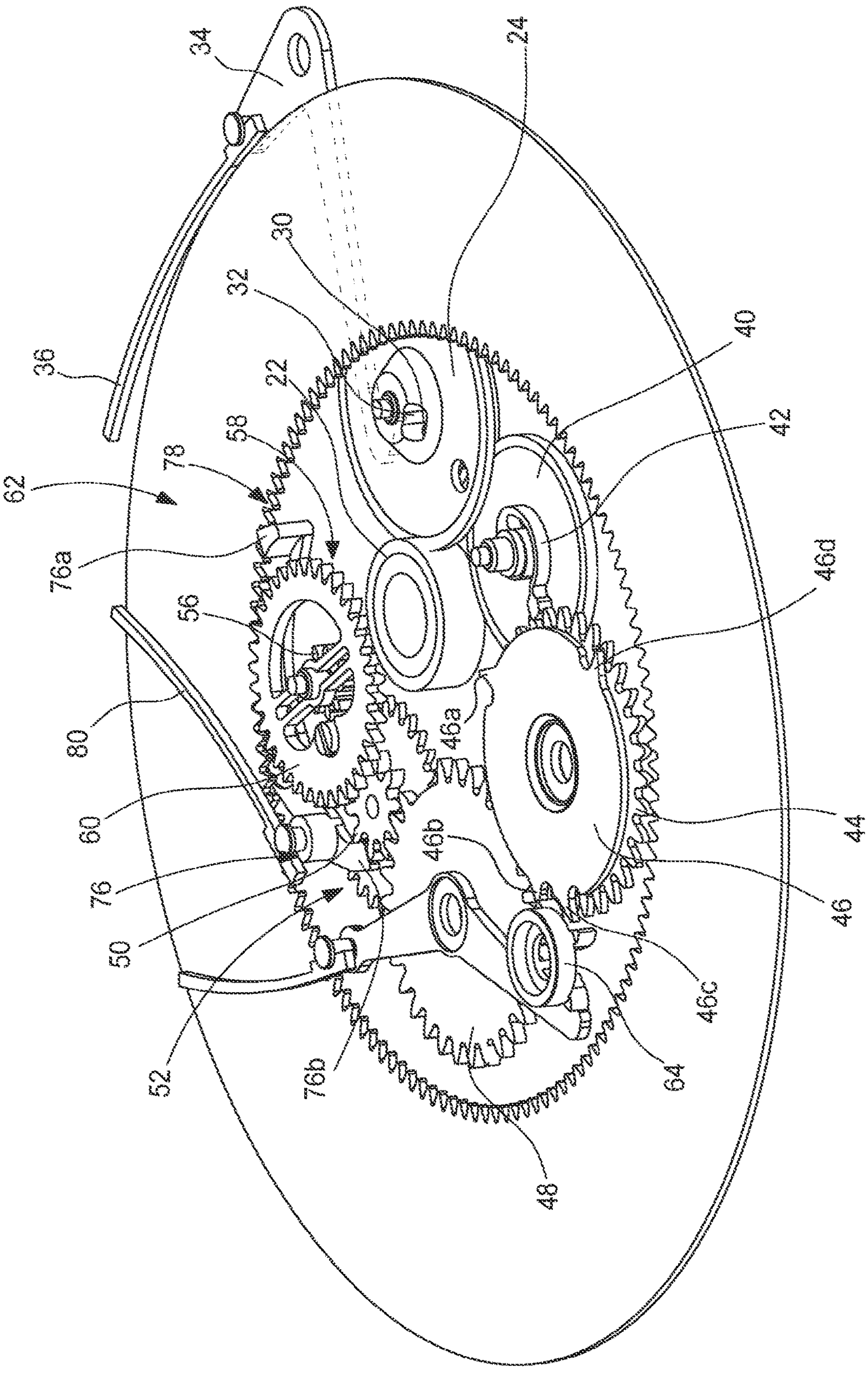
FIG. 4 is a perspective view of the large date calendar display mechanism in FIG. 3, wherein the kinematic chain driving the indicator of the tens component of the date is more particularly visible.

The cam wheel 26 drives a date drive wheel 40 which bears a finger 42 via which the date drive wheel 40 controls, once a day, the advancing of a thirty-one-tooth wheel 44 by one step (see FIG. 4). Moreover, a programming wheel 46 is fixed to the thirty-one-tooth wheel 44. The thirty-one-tooth wheel 44 meshes, in turn, with a drive wheel 48 itself engaged with an intermediate pinion 50 of an intermediate wheel set 52. Finally, an intermediate wheel 54 of the intermediate wheel set 52 meshes with a units drive pinion 56 of a units drive wheel set 58, a units drive wheel 60 whereof drives an indicator of the units component of the date. For the purposes of illustration only and not intended to limit the invention, this indicator of the units component of the date takes on the form of a ring 62. This units indicator ring 62 bears the indications “0”, “1”, “2”, “3”, “4”, “5”, “6”, “7”, “8” and “9” which correspond to the indications of the units component of the date and advances by one step a day, except when passing from “31” of a month to “1” of the following month.

The programming wheel 46 is provided with four teeth 46*a*, 46*b*, 46*c* and 46*d* via which this programming wheel 46 drives, by one step every 10 days, a four-tooth star 64 to which an indicator of the tens component of the date is fixed. For the purposes of illustration only and not intended to limit the invention, this indicator of the tens component of the date is designed in the form of a disc 66. The tens indicator disc 66 bears the indications “0”, “1”, “2” and “3” which correspond to the indications of the tens component of the date.

As specified hereinabove, the units indicator ring 62 advances by one step a day, except when passing from “31” of a month to “1” of the following month. During this passage, the units indicator ring 62 must remain still. More specifically, the marking “1” borne by the indicator of the units component of the date is used both to compose the date indication “31” at the end of a month having 31 days, and to compose the date indication “01” at the start of the following month. It is therefore key that the units indicator ring 62 remains still during this lapse of time so that the date indication that appears through the aperture 18 made in the dial 16 of the timepiece 14 is accurate.

Figure 5:
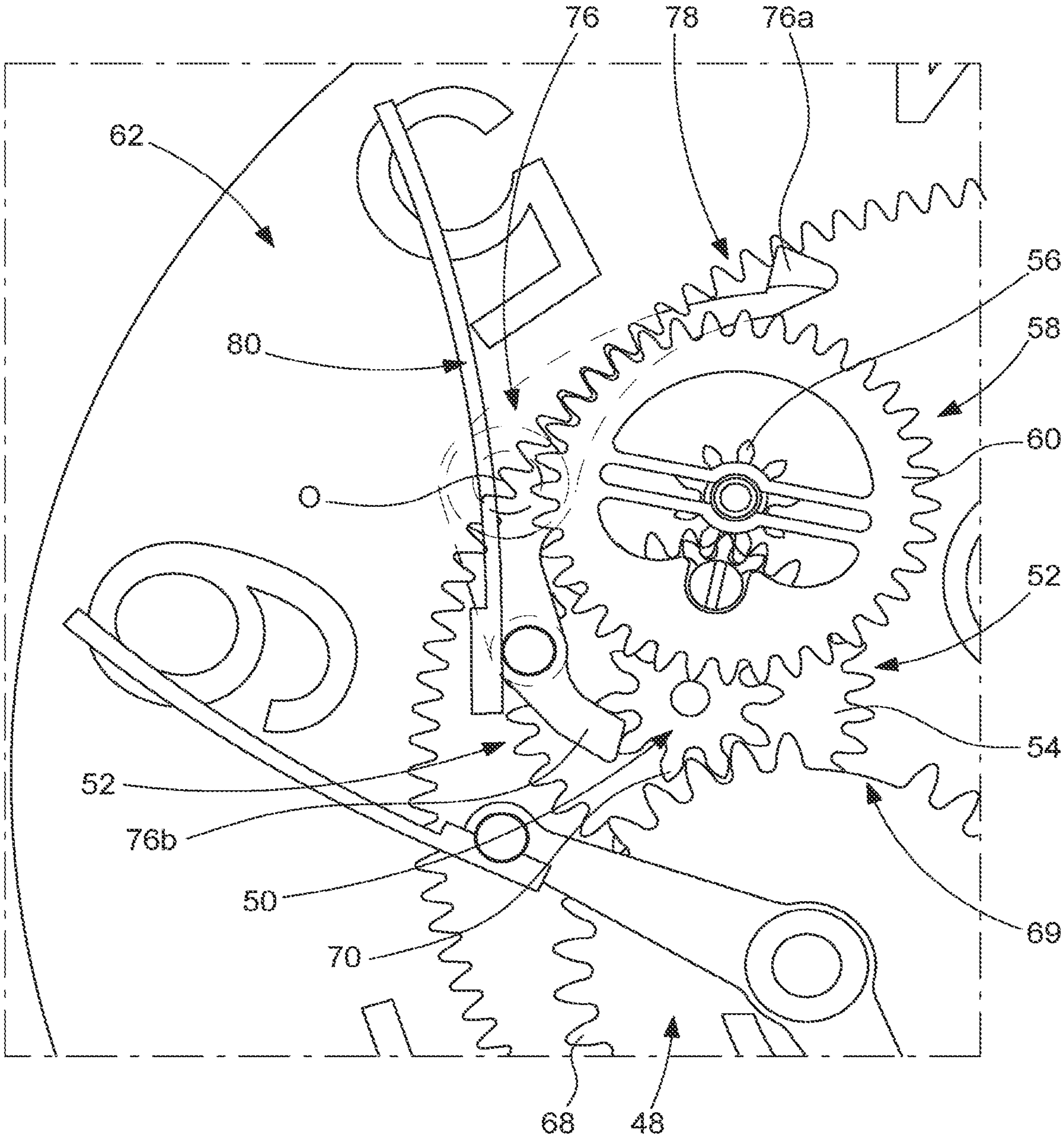
FIG. 5 is a view identical to that of FIG. 3, with the exception that the indicator of the tens component of the date has been omitted.

To achieve this, two teeth of a thirty-one-tooth toothing 68 of the drive wheel 48 are missing and leave an empty space 69 (see FIG. 5). Thus, when this portion devoid of teeth of the thirty-one-tooth toothing 68 of the drive wheel 48 is facing a toothing 70 of the intermediate pinion 50, the angular position of this intermediate pinion 50 is no longer appropriately ensured which, at the end of the kinematic chain, no longer guarantees the correct positioning of the indication “1” borne by the units indicator ring 62 in the aperture 18 made in the dial 16 of the timepiece 14. Of course, this problem is unacceptable.

Figure 7A:
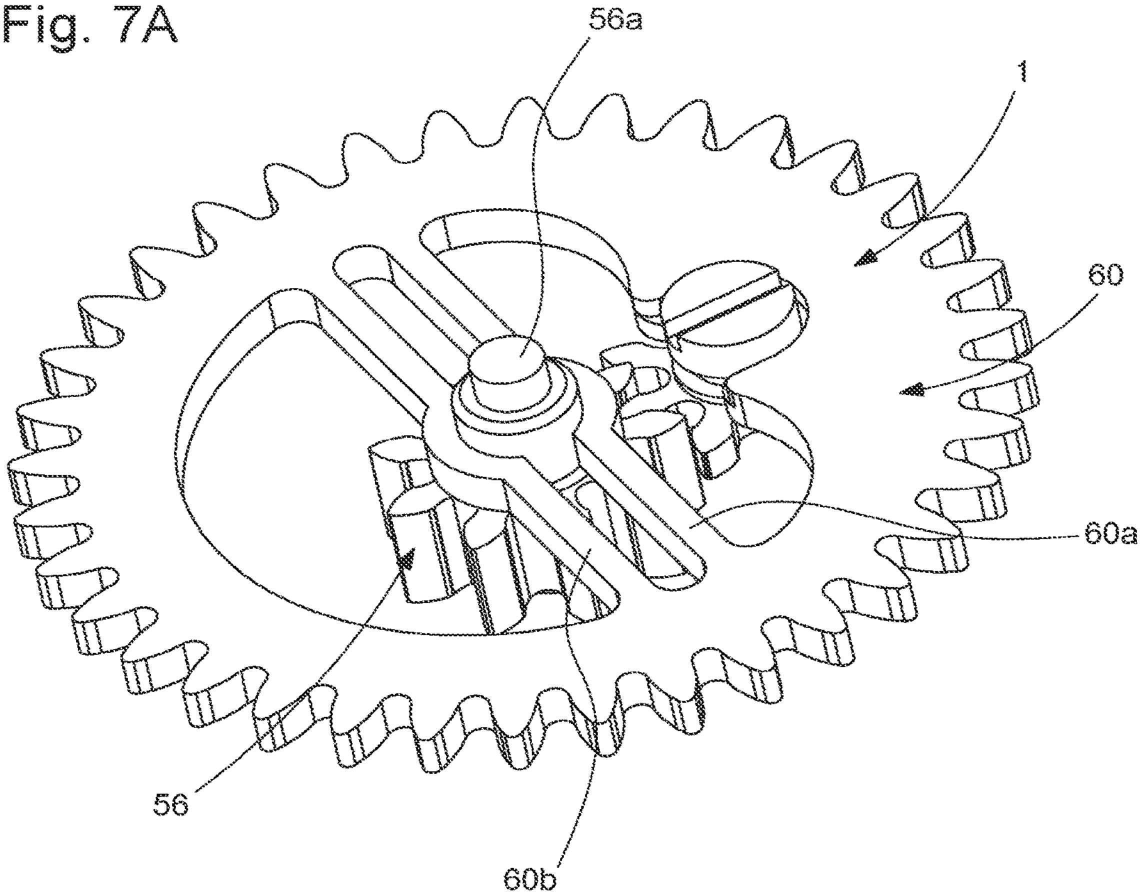
FIG. 7A is a larger scale perspective view of the adjusting system according to the invention.
Figure 7B:
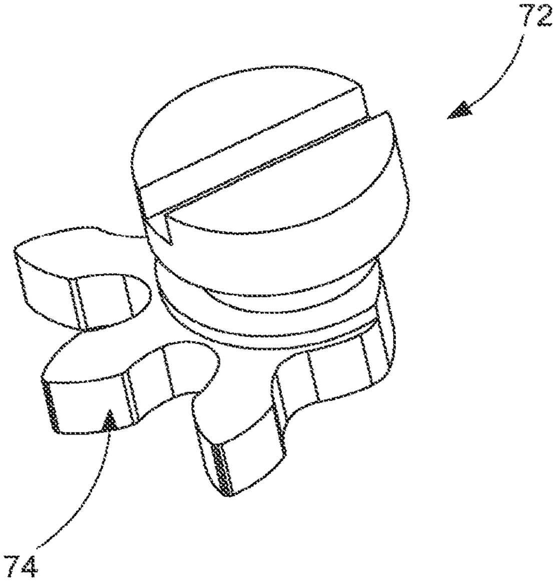
FIG. 7B is a larger scale view of the adjusting member.

This is why, in accordance with the invention, it is envisaged to equip the large date display mechanism 12 with an adjusting system 1 according to the invention. For this purpose, the units drive pinion 56 that acts as the first toothed wheel set, the angular position whereof is to be adjusted, is frictionally mounted on the units drive wheel 60 which acts as the support. In the embodiment shown only by way of example in FIG. 7A, the units drive pinion 56 comprises an axis 56*a* via which it is frictionally mounted between two parallel arms 60*a* and 60*b*, which substantially extend along a diameter of the units drive wheel 60. The adjusting system 1 according to the invention is completed by an adjusting member 72 mounted such that it can pivot on the units drive wheel 60. This adjusting member 72 comprises a toothed sector 74 via which it meshes with the toothing of the units drive pinion 56 (see FIG. 7B). By causing the adjusting member 72 to rotate, for example by means of a screwdriver, in one direction or in the other, the angular position of the units drive pinion 56 can be precisely adjusted, such that this units drive pinion 56 meshes in an optimum manner with the intermediate wheel 54 that drives it. It must be understood that the friction forces present between the units drive pinion 56 and the units drive wheel 60 are high enough for the units drive pinion 56 to be able to drive the units drive wheel 60 such that it rotates when it is itself rotated by the intermediate wheel 54, however low enough for the angular position of the units drive pinion 56 to be able to be adjusted. Finally, the units drive wheel 60 drives the units indicator ring 62 by meshing with the inner toothing 78 of this units indicator ring 62.

Again in order to improve the operation of the large date display mechanism 1, this mechanism can further be provided with a dual jumper 76 arranged such that it pivots about a centre O. This dual jumper 76 is provided with a first beak 76*a* via which it engages with the toothing 70 of the intermediate pinion 50, and with a second beak 76*b* via which it engages with an inner toothing 78 of the units indicator ring 62. The dual jumper 76 is held such that it elastically bears against the toothing 70 of the intermediate pinion 50 and against the inner toothing 78 of the units indicator ring 62 by a spring 80. When the intermediate pinion 50 advances by one step, the dual jumper 76 pivots about the pivot centre O thereof and the beak 76*a* thereof moves aside by passing from the gap between two consecutive teeth of the toothing 70 of this intermediate pinion 50 to the following gap. Simultaneously, the second beak 76*b* of the dual jumper 76 is released from the gap between the two teeth of the inner toothing 78 of the units indicator ring 62 and falls into the following gap. The geometrical configuration of the dual jumper 76 and the positioning of the pivot centre O thereof are such that when the dual jumper 76 pivots, it is simultaneously released from the toothing 70 of the intermediate pinion 50 and from the inner toothing 78 of the units indicator ring 62. Thus, when passing, at the end of a month, from the date indication "31" to the date indication "1" of the following month, the intermediate pinion 50, although not engaged with the drive wheel 48, is held in position by the beak 76*a* of the dual jumper 76 such that there is no risk of the date indication "1" from not being appropriately centred inside the aperture 18 made in the dial 16 of the timepiece 14.

The intermediate pinion 50 forms a part of the intermediate wheel set 52 with an intermediate wheel 54 with which it is coupled in rotation. This intermediate wheel 54 meshes, in turn, with a units drive pinion 56 of a units drive wheel set 58 of the units indicator ring 62. This units drive pinion 56 is coupled in rotation with the units drive wheel 60 which drives the units indicator ring 62 by meshing with the inner toothing 78 of this units indicator ring 62.

It is evident that the present invention is not limited to the embodiment described above and that various simple alternatives and modifications can be considered by a person skilled in the art without leaving the scope of the invention as defined by the accompanying claims. It should in particular be noted that the number of teeth of the toothing 68 of the drive wheel 48 can differ from thirty one teeth and that the number of teeth omitted can differ from two, and can be equal to one or three for example.

NOMENCLATURE

1. Adjusting system
2. Support
4. First toothed wheel set
6. Second toothed wheel set
8. Adjusting member
10. Toothed sector
12. Large date display mechanism
14. Wristwatch
16. Dial
18. Aperture
20. Large date indication
22. Intermediate centre wheel
24. Cam drive wheel
26. Cam wheel
28. Cam
28*a*. Cam profile
28*b*. Discontinuity
30. Pin
32. Oblong hole
32*a*. Inner edge
34. Release lever
36. Spring
38. Beak 26
40. Date drive wheel
42. Finger
44. Thirty-one-tooth wheel
46. Programming wheel
46*a*, 46*b*, 46*c*, 46*d*. Teeth
48. Drive wheel
50. Intermediate pinion
52. Intermediate wheel set
54. Intermediate wheel
56. Units drive pinion
58. Units drive wheel set
60. Units drive wheel
60*a*, 60*b*. Parallel arms
62. Units indicator ring
64. Four-tooth star
66. Tens indicator disc
68. Toothing
56*a*. Axis
69. Empty space
70. Toothing
72. Adjusting member
74. Toothed sector
76. Dual jumper
76*a*. First beak
76*b*. Second beak
O. Pivot centre
78. Inner toothing
80. Spring

The invention claimed is:

1. A system for adjusting an angular position of a first toothed wheel set, the adjusting system comprising:

a support wheel on which the first toothed wheel set is mounted such that it can pivot; and an adjusting member pivotally mounted on the support wheel, the adjustment member including a toothed sector on a first end that is positioned on a first side of the support wheel and configured to directly contact a tooth of the first toothed wheel set to adjust the angular position of the first toothed wheel set relative to the support wheel, wherein a second end of the adjusting member protrudes through a second side of the support wheel, the second side being opposite to the first side, to allow an action to the second end to be applied to the angular position of the first toothed wheel set.

2. The adjusting system according to claim 1, wherein the first toothed wheel set is a pinion, and the pinion is frictionally mounted on the support wheel so as to form a wheel set.

3. The adjusting system according to claim 1, wherein the support wheel includes two parallel arms and the first toothed wheel set includes a pinion that is frictionally mounted between the two parallel arms.

4. The adjusting system according to claim 1, wherein the support wheel includes teeth extending around a perimeter of the support wheel.

5. A timepiece comprising:

the adjusting system according to claim 1.

6. The adjusting system according to claim 1, wherein teeth of the toothed sector of the adjusting member do not extend around a circumference of the adjusting member.

7. The adjusting system according to claim 1, wherein the second end of the adjusting member that protrudes through the second side of the support wheel includes a slot that receives a screwdriver to perform the action to the second end to be applied to the angular position of the first toothed wheel set.

8. The adjusting system according to claim 1, wherein the first toothed wheel set is engaged with a second toothed wheel set that is offset from the adjusting member in an axial direction such that the tooth of the first toothed wheel set, while the tooth is in direct contact with the toothed sector of the adjustment member is also in direct contact with the second toothed wheel set.

* * * * *